United States Patent [19]
Gioacchini

[11] Patent Number: 5,576,777
[45] Date of Patent: Nov. 19, 1996

[54] FRAME FOR GLASSES WITH INTERCHANGEABLE LENSES

[75] Inventor: Giovanni Gioacchini, Ripe, Italy

[73] Assignee: F.lli Guzzini S.p.A., Recanti Macerata, Italy

[21] Appl. No.: 371,760

[22] Filed: Jan. 12, 1995

[51] Int. Cl.⁶ .............................. G02C 1/00; G02C 1/04
[52] U.S. Cl. ........................... 351/86; 351/103; 351/106
[58] Field of Search ................................ 351/86, 83, 87, 351/103, 106, 41, 110, 104

[56] References Cited

U.S. PATENT DOCUMENTS

| 2,516,549 | 7/1950 | Chappell . | |
|---|---|---|---|
| 2,831,393 | 4/1958 | Bennett . | |
| 2,844,071 | 7/1958 | Schumacher . | |
| 3,552,840 | 1/1971 | Braget | 351/86 |
| 4,822,158 | 4/1989 | Porsche | 351/57 |
| 5,270,743 | 12/1993 | Hofmair et al. | 351/106 |

FOREIGN PATENT DOCUMENTS

| 1029215 | 5/1953 | France . |
|---|---|---|
| 1027777 | 5/1953 | France . |
| 2615004 | 11/1988 | France . |

OTHER PUBLICATIONS

Patent Abstracts of Japan, vol. 5, No. 69(P–060) 9 May 1981, and Japan 56 019 027 (Seiko Epsom Corp), 23 Feb. 1981.

Primary Examiner—Hung Dang
Attorney, Agent, or Firm—Dvorak and Traub

[57] ABSTRACT

A frame for eyeglasses has interchangeable lenses in which the lenses are connected to a front element of the frame which is supplied with rigid supports that contain a snap-fitting groove which creates an interference connection. The frame also includes rings on each side which yield elastically in a circumferential direction, and which attach along the peripheral edge of the lenses. The rings are pressed into the supports through elastic interference, in such a way that the lenses are connected structurally to the frame, but can be removed through the action of the snap-fitting connection.

7 Claims, 1 Drawing Sheet

FRAME FOR GLASSES WITH INTERCHANGEABLE LENSES

BACKGROUND OF THE INVENTION

This invention refers to a frame for glasses with interchangeable lenses in which the lenses are connected to front elements of the frame supplied with rigid supports connected to a part of a peripheral edge of said lenses.

Frames for glasses, though available in a wide variety of models with various styles, all refer to two characteristic types of construction designs for what concerns the system with which the lenses are connected to the front frame structure.

In the first design solution, the lens is connected to the frame along the entire length of its peripheral edge by means of an attachment system which structurally connects it to the frame.

In the second design solution, which is used in particular to create lightweight glasses, the lens is instead connected to rigid supports of the front element only along a limited section of the peripheral edge, remaining completely free at the remaining part of its contour.

The fundamental problem of known frames basically refers to the fact that, in both cases, the lenses are attached to the frame in a stable manner and can be replaced only by skilled personnel.

SUMMARY OF THE INVENTION

The purpose of this invention, which is characterized by the claims, is therefore to solve the problem of supplying frames for glasses in which the lenses can be changed directly by the user, with a simple manual operation, without requiring special skills, or special tools.

The invention achieves this purpose by using frames including rigid supports, attached to front elements of the frame, which can be connected to a part of the peripheral edge of the lenses, and interacting with rings which yield elastically. The latter can be connected peripherally to both the rigid supports of the front element and to the lenses, so that they are pressed against each other, as a mutual stop on said part of the edge, by means of elastic interference, connecting the lenses structurally, but so that they can be removed, to the front element of the frame.

In addition to the reference advantage of changing the lenses, the invention also offers an additional advantage in which it is possible to create frames with a structural resistance that is similar to that of the well-known first type of frames, but with a great reduction in weight with respect to this type.

Another advantage of the invention, with respect to the solutions involving an overhanging lens support, not only concerns the greater overall resistance of the frame thanks to the structural support of the lenses, but also very effective protection of the edges against chipping due to impacts which, as is known, are very frequent in such types of glasses.

Compared to the solutions which include support of the overhanging lenses, the invention has the additional advantage of providing total protection of the edge of the lens against the chipping which typically occurs in these types of glasses.

Another advantage of the invention involves the possibility of creating glasses which provide the user with much greater safety than what is offered by the known type of glasses in case of frontal impact of the head during an accident. In fact, under such conditions, the risk that the lenses will shatter is much lower due to the fact that it is more likely that the impact will cause the lens and the ring to disassemble from the support of the front element.

Another advantage of the invention is that the nose support tabs of the frame can be built directly into the rings, when these are made with plastic material, with a subsequent great reduction in frame construction costs and the weight of said frame.

Another advantage of the invention also refers to the fact that by changing the geometric shapes of the rings and lenses, as well as their materials and/or colors, it is possible, with the same front element of the structure, to obtain a very wide range of different combinations and thus vary the styling effect of the glasses as required.

BRIEF DESCRIPTION OF THE DRAWINGS

The invention is described below in greater detail through the use of drawings which illustrate what is merely a single and non-limiting example in which.

DESCRIPTION OF THE PREFERRED EMBODIMENT

Figure 1:
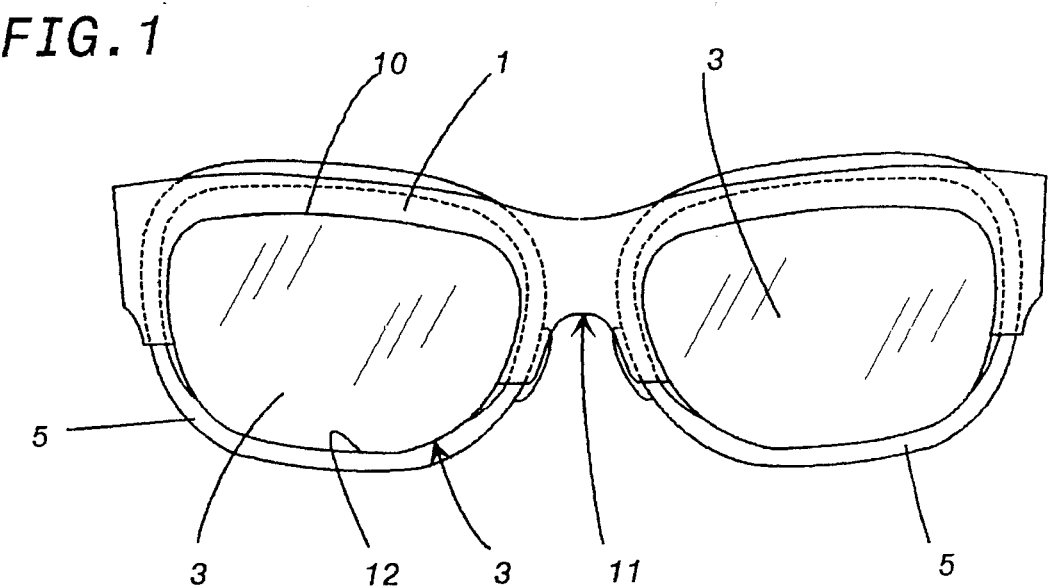
FIG. 1 presents a front view of an glasses frame created according to the invention.

With reference to the attached figures, it can be observed that the invention basically consists of a frame (11) made with plastic material, for glasses with interchangeable lenses (3), in which the lenses (3) are connected to front elements (1) of the frame (11), supplied with rigid arched supports (4) connected to the corresponding first part (10) of the peripheral edge (2) of the lenses (3).

The frame (11) includes the rings (5), made with plastic or metallic material, which yield elastically, at least according to their circumferential direction (6).

These rings (5) are connected peripherally to the rigid supports (4) and to a second part (12) of the edge (2) of the lenses (3) so that they are pressed against each other, as a result of the elastic interference generated between the ring (5) and the first part (10) of the edge of the lens (3) and the support (4), which push against each other.

Figure 2:
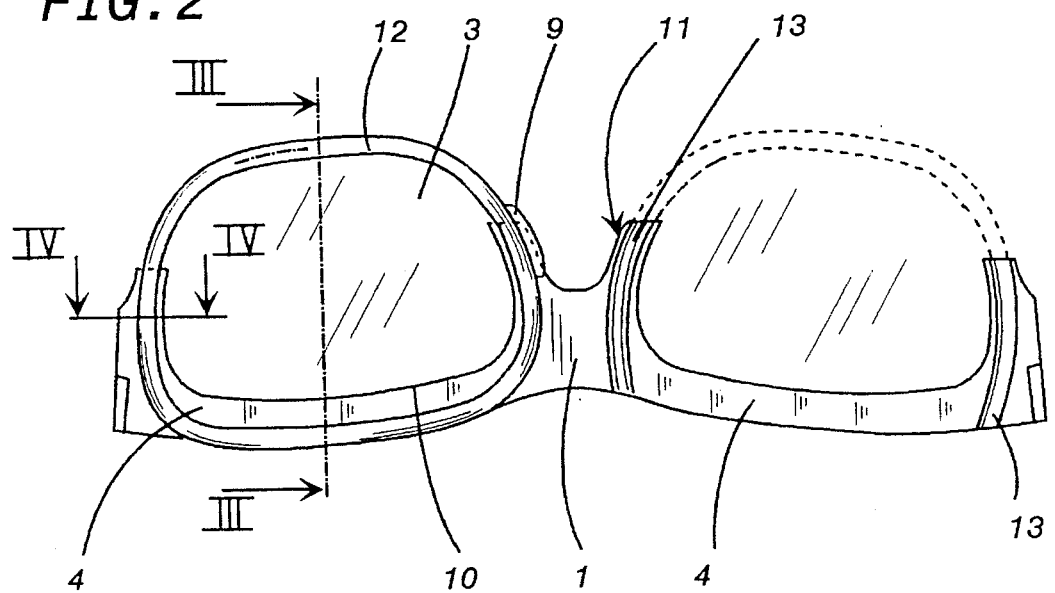
FIG. 2 presents a rear view of the frame shown in FIG. 1 with some parts removed.
Figure 4:
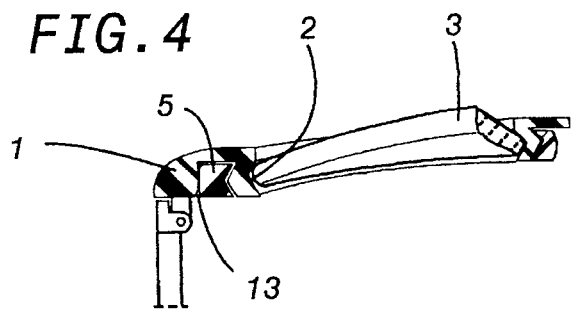
FIG. 4 presents a cross-section of the invention shown in FIG. 2, sectioned according to the IV—IV line of FIG. 3.

By observing FIGS. 2 and 4 it can be seen that the arched supports (4) are created directly in the body of the front element (1) and have grooves (13) within which the rings are housed (15); the latter also include (see FIG. 3) a shaped internal groove (7) that matches the contoured edge (2) of the lens (3).

The groove (7) extends along the entire length of the ring (5) being connected to the rigid support (4) of the front element (1), on a side opposite to the one involving the lens (3), relative to a surface (8) of the support (4) that is shaped to match.

Figure 3:
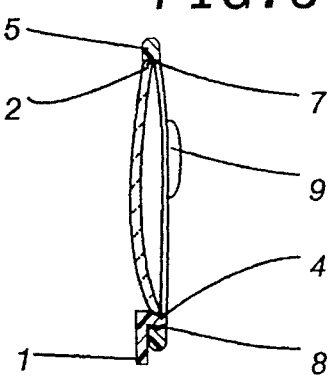
FIG. 3 presents a cross-section of the invention illustrated in FIG. 2, sectioned according to the II—II section line.

In addition, by observing FIGS. 2 and 3, it can be seen that the ring (5) sustains a nose support tab (8) that is built directly into that same ring (5) at the time it is made.

It is possible to make numerous changes and variation to the invention designed in this manner, and all such modifications are within the context of the design concept.

The first variation of the invention can be achieved, for example, by creating the arched supports (4) as elements which are separate from the frame (11) which are then connected to the front element (1), instead of being built directly into that same element (1) as indicated in FIG. 2.

Other possible variations may be obtained by using different materials and/or varying their combinations for the various parts of the frame (11), thus creating a frame (11), for example, with plastic and supports (4) made with plastic or metals or a metal frame (11) and metal or plastic supports (4).

Obviously, in practice, changes and/or improvements can be made which are always within the context of the following claims.

I claim:

1. An eyeglass frame having interchangeable contoured lenses on each side of said frame, comprising:

a front element that includes rigid arched supports integrally formed on each of said frame sides, each of said arched supports formed by an upper portion and a pair of integral, curved side portions, each said arched support defining a peripheral edge, said peripheral edge having a groove integrally formed in said side portions for receiving a ring, said groove having a surface which forms an interface snap-fit connection;

a said ring on each side of said frame which encircles a peripheral edge of said lenses, protects said edge from chipping and defining a ring circumference, said ring having an inside surface and an outside surface, said inside surface provided with an internal recess along said circumference for receiving said peripheral edge of said lens, said internal recess having a shape which is dependent upon a contour of said lens, said ring elastically deformable about said circumference and including a nose support tab for supporting said frame on a nose, said nose tab integrally formed as part of said ring, said ring outside surface having a complementary shape to said groove of said arched support, said shape being independent of said contour of said lens, wherein said ring is removably connected to said front element by snap-fitting said outside surface of said ring into said interference connection on said arched supports.

2. Frame, according to claim 1, wherein said ring is made with plastic material.

3. Frame, according to claim 1, wherein ring is made with metallic material.

4. The frame according to claim 1, made with plastic material.

5. The frame according to claim 1, made with plastic material wherein said arched supports are made with metal.

6. The frame according to claim 1, made with metallic material.

7. The frame according to claim 1, made with metallic material, wherein said arched supports are made with plastic material.

\* \* \* \* \*